United States Patent
Huang

(10) Patent No.: US 10,233,602 B2
(45) Date of Patent: Mar. 19, 2019

(54) RESEVOIR DREDGING ASSEMBLY

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 0 days.

(21) Appl. No.: 15/691,145

(22) Filed: Aug. 30, 2017

(65) Prior Publication Data

US 2018/0238008 A1 Aug. 23, 2018

(30) Foreign Application Priority Data

Feb. 17, 2017 (TW) .............................. 106105259 A

(51) Int. Cl.
*E02B 8/02* (2006.01)
*E02B 9/02* (2006.01)
*E02B 3/02* (2006.01)

(52) U.S. Cl.
CPC ................ *E02B 8/02* (2013.01); *E02B 3/023* (2013.01); *E02B 9/022* (2013.01)

(58) Field of Classification Search
CPC ... E02B 9/06; E02B 3/023; E02B 8/06; E02B 9/02; E02B 3/02; E02B 8/02; E02B 9/022; Y02E 10/22; F03B 13/08
USPC ........... 405/52, 74, 75, 107, 108; 210/747.5, 210/800; 37/307
See application file for complete search history.

(56) References Cited

U.S. PATENT DOCUMENTS

| | | | | | |
|---|---|---|---|---|---|
| 1,651,979 | A * | 12/1927 | Sykes | ....................... | A01J 9/00 137/614.17 |
| 2,442,358 | A * | 6/1948 | Harp | ........................ | E02B 8/02 210/170.1 |
| 3,638,432 | A * | 2/1972 | Schoonmaker | ......... | E02B 3/023 37/335 |
| 4,074,535 | A * | 2/1978 | Schoonmaker | ....... | E02F 3/8808 37/335 |
| 7,837,411 | B2 * | 11/2010 | Krouse | .................... | F03B 13/08 405/75 |
| 8,631,638 | B2 * | 1/2014 | Carlos | ....................... | F02C 6/00 405/78 |
| 9,797,107 | B1 * | 10/2017 | Huang | ...................... | E02B 8/06 |
| 2002/0146286 | A1 * | 10/2002 | Tsuchiya | ................. | E02B 3/023 405/107 |
| 2003/0066809 | A1 * | 4/2003 | Wang | ......................... | E02B 9/06 210/800 |
| 2005/0076545 | A1 * | 4/2005 | Tsuchiya | ................... | E02B 3/02 37/307 |

(Continued)

FOREIGN PATENT DOCUMENTS

CN 205296100 * 6/2016

*Primary Examiner* — Carib A Oquendo
(74) *Attorney, Agent, or Firm* — Muncy, Geissler, Olds & Lowe, P.C.

(57) ABSTRACT

A reservoir dredging assembly includes a dredging tube and at least one dredging device adapted to be installed to at least one secondary reservoir. The at least one dredging device includes a linking tube, an extending tube, a water gate, and a control unit. The linking tube is connected to the dredging tube for water in a primary reservoir, together with sediments deposited therein, to flow through. The extending tube has a top cutlet adapted to be located lower than the maximum water level of the primary reservoir. The water gate is mounted in the linking tube at a position downstream of the extending tube. The control unit is convertible between a first state for closing the water gate and a second state for opening the water gate.

6 Claims, 4 Drawing Sheets

(56) References Cited

U.S. PATENT DOCUMENTS

2008/0143116 A1\* 6/2008 Obermeyer ............. F03B 13/08
  290/54
2009/0255865 A1\* 10/2009 Lee ........................... E02B 8/02
  210/170.09

\* cited by examiner

RESEVOIR DREDGING ASSEMBLY

CROSS-REFERENCE TO RELATED APPLICATION

This application claims priority of Taiwanese Patent Application No. 106105259, filed on Feb. 17, 2017.

FIELD

The disclosure relates to a dredging assembly, and more particularly to a reservoir dredging assembly.

BACKGROUND

Dredging is an excavation technique commonly performed underwater to maintain the holding capacity of reservoirs and lakes. In places with frequent storm presence, a more advanced dredging tool for reservoirs has been thought after to clean up bottom sediments brought by heavy rainfall from the storm, as traditional dredging technique, such as suction dredging or direct excavation of sediments during drought, cannot clean up the sediments faster than how much more gets incremented.

There exists a dredging method utilizing a reservoir dredging assembly, which includes a dredging tube adapted to be laid on a bottom of a reservoir and a water gate that is mounted in the dredging tube to control the water flow leading to a river downstream. Due to water level difference between the reservoir and the river, when the water gate is open, water in the reservoir will promptly but abruptly carry the sediments deposited therein downstream through the dredging tube. Although the water flow caused by considerable elevation difference can effectively carry the sediments downstream, it is also highly turbulent and rapid, becoming problematic when the sediments within the water flow cause tearing of the interior surface of the dredging tube, jeopardizing service life of the reservoir dredging assembly.

SUMMARY

Therefore, an object of the disclosure is to provide a reservoir dredging assembly that can alleviate the drawback of the prior art.

According to the disclosure, the reservoir dredging assembly includes a dredging tube adapted to be laid on a bottom of a primary reservoir, and at least one dredging device adapted to be installed to at least one secondary reservoir which is located downstream of the primary reservoir and which has a maximum water level lower than a maximum water level of the primary reservoir.

The at least one dredging device includes a linking tube, an extending tube, a water gate, and a control unit. The linking tube is connected to the dredging tube, so that water in the primary reservoir, together with sediments deposited therein, is permitted to flow into the linking tube via the dredging tube. The extending tube extends upwardly from the linking tube, and has a top outlet adapted to be located lower than the maximum water level of the primary reservoir. The water gate is mounted in the linking tube at a position downstream of the extending tube.

The control unit is convertible between a first state for closing the water gate and a second state for opening the water gate. When the control unit is in the first state, the water advanced from the primary reservoir into the linking tube is directed into the extending tube and flows out of the extending tube from the top outlet. When the water level of the at least one secondary reservoir is reduced to be substantially equal to a height of the top outlet of the extending tube, the control unit is operable to convert to the second state, so that the water in the linking tube is permitted to flow through said water gate.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
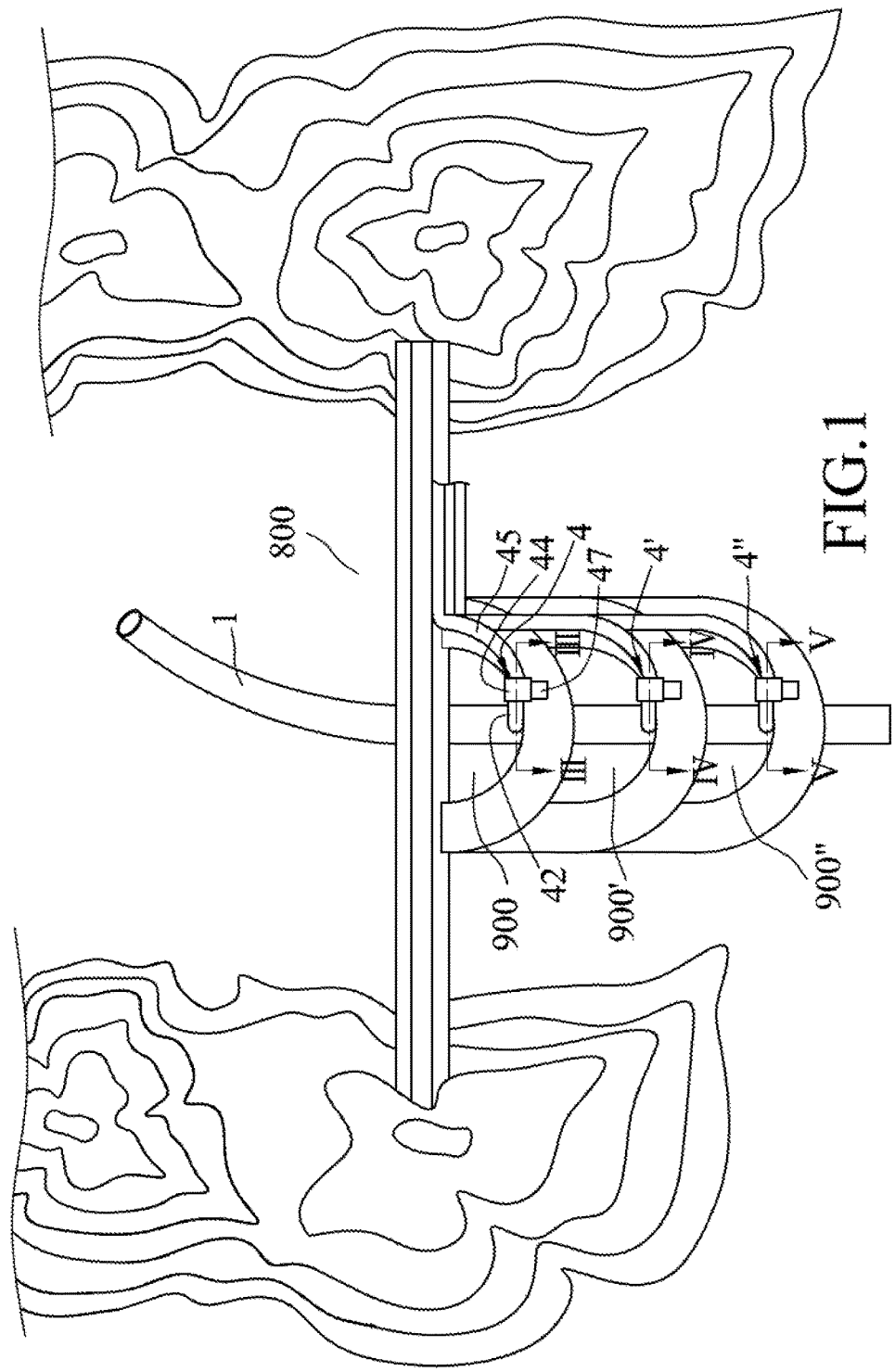
FIG. 1 is a top view of an embodiment of a reservoir dredging assembly according to the disclosure, illustrating the reservoir dredging assembly disposed at a primary reservoir and multiple secondary reservoirs.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
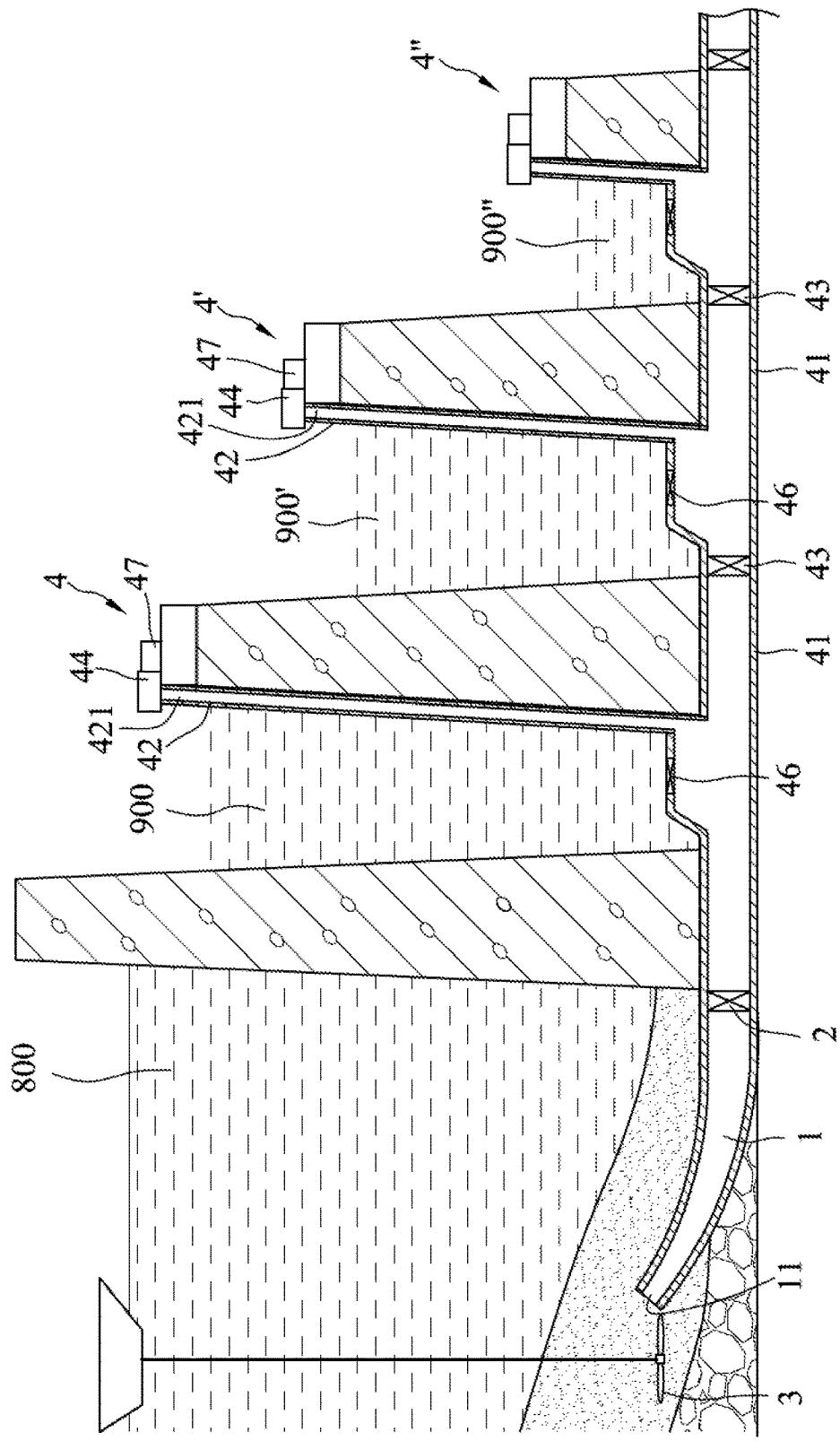
FIG. 2 is a schematic sectional view of the embodiment.

Referring to FIGS. 1 and 2, an embodiment of a reservoir dredging assembly according to the disclosure is adapted to be installed to a primary reservoir 800 and three secondary reservoirs 900, 900', 900" that are located downstream of the primary reservoir 800 to release sediments from bottom of the primary reservoir 800 downstream. Each of the secondary reservoirs 900, 900', 900" has a maximum water level lower than that of the primary reservoir 800. The secondary reservoirs 900, 900', 900" are arranged in a manner that a maximum water level of each of the secondary reservoirs 900, 900', 900" is lower than that of an upstream one of the secondary reservoirs 900, 900', 900". The reservoir dredging assembly includes a dredging tube 1, a main gate 2, a stirring device 3, and three dredging devices 4, 4', 4".

The dredging tube 1 is adapted to be laid on the bottom of the primary reservoir 800, and includes a tube entrance 11 for passage of water flow therethrough. The main gate 2 is disposed in the dredging tube 1 to allow or disable passage of water flow from the primary reservoir 800 into the dredging tube 1. The stirring device 3 is operable to mix the sediments and water in the primary reservoir 800. In this embodiment, the stirring device 3 is hanged underwater by a ship in the primary reservoir 800, and extends to the bottom of the primary reservoir 800 in order to mix the sediment and the water therein.

The dredging devices 4, 4', 4" are installed respectively to the secondary reservoirs 900, 900', 900". Each of the dredging devices 4, 4', 4" includes a linking tube 41 that is disposed at a bottom of a respective one of the secondary reservoirs 900, 900', 900" and that is connected to the dredging tube 1, an extending tube 42 that extends upwardly and obliquely from the linking tube 41, and a water gate 43 that is mounted in the linking tube 41 at a position downstream of the extending tube 42. Each of the dredging devices 4, 4', 4" further includes a power generating unit 44 mounted on top of the respective one of the secondary reservoirs 900, 900', 900", a guide tube 45 for draining water that flows through the power generating unit 44, a stop gate 46 connected to the linking tube 41, and a control unit 47.

Referring to FIGS. 1, 3, 4 and 5, each of the dredging devices 4, 4', 4" further includes at least one auxiliary tube 48 extending downwardly from the extending tube 42, and at least one auxiliary gate 49 disposed at a distal end of the at least one auxiliary tube 48. In this embodiment, the dredging device 4 includes three spaced-apart auxiliary tubes 48 and three auxiliary gates 49, the dredging device 4' includes two spaced-apart auxiliary tubes 48 and two auxiliary gates 49, and the dredging device 4" includes one auxiliary tube 48 and one auxiliary gates 49.

Figure 3:
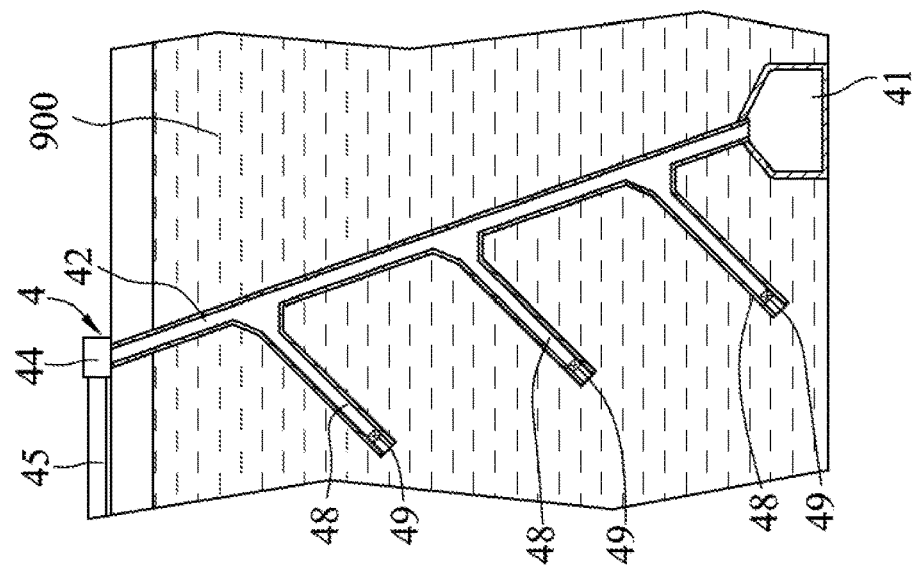
FIG. 3 is a sectional view taken along line in FIG. 1.
Figure 4:
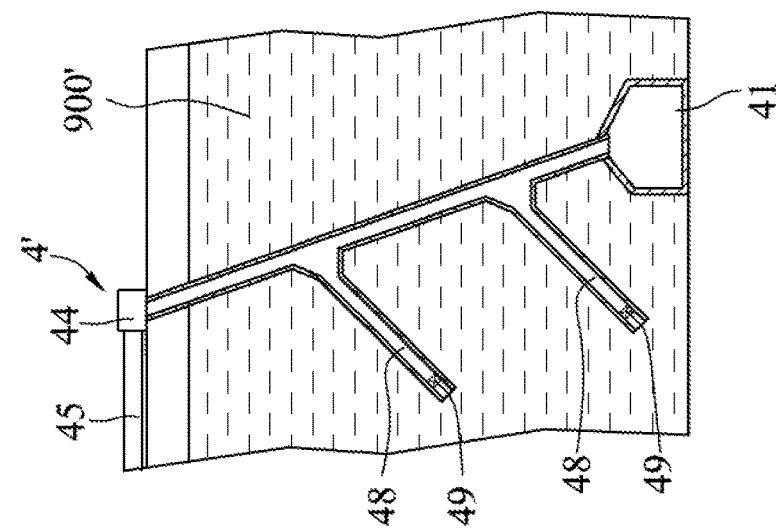
FIG. 4 is a sectional view taken along line IV-IV in FIG. 1.
Figure 5:
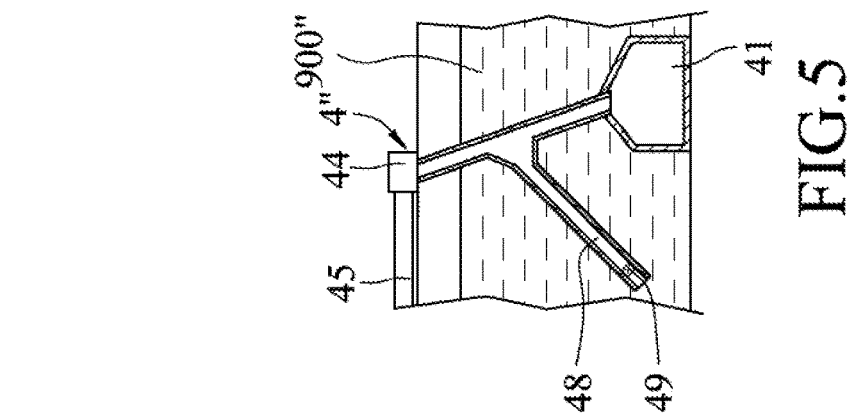
FIG. 5 is a sectional view taken along line V-V in FIG. 1.

Referring to FIGS. 1 to 3, the linking tubes 41 of the dredging devices 4, 4', 4" are connected together in sequence, so that water in the primary reservoir 800, together with sediments deposited therein, is permitted to flow into the linking tube 41 via the dredging tube 1. The extending tube 42 of each dredging device 4, 4', 4" has a length longer than that of the extending tube 42 of another dredging device 4, 4', 4" which is disposed downstream of the dredging device 4, 4', 4", and has a top outlet 421 that is adapted to be located lower than the maximum water level of the upstream one of the primary reservoir 800 and the secondary reservoirs 900, 900', 900".

The control unit 47 of each of the dredging devices 4, 4', 4" operates in the same manner. Only the operation of the control unit 47 of the dredging device 4 is described in the following for the sake of brevity. The control unit 47 is convertible between a first state for closing the water gate 43, the stop gate 46, and the auxiliary gates 49, and a second state for opening the water gate 43, the stop gate 46, and the auxiliary gates 49. The control unit 47 controls the activities of the water gate 43, the stop gate 46 and the auxiliary gate 49 via signals. When the control unit 47 is in the first state, the water gate 43 is signaled to be or remain closed, directing the water from the linking tube 41 into the extending tube 42 and toward the top outlet 421 of the extending tube 42. At the same time, both the stop gate 46 and the auxiliary gate (s) 49 are closed. When the control unit 47 is in the second state, the water gate 43 is signaled to open, allowing the water from the linking tube 41 to continue downstream. At the same time, the control unit 47 signals the stop gate 46 to open for allowing the water in the secondary reservoir 900 to flow into the linking tube 41, and also signals the auxiliary gate(s) 49 to open for allowing the water in the auxiliary tube 48 to flow into the secondary reservoir 900.

With the components of the reservoir dredging assembly described, the procedure of removal of sediments from the primary reservoir 800 will be further explained. In this embodiment, the water level of the primary reservoir 800 is 200 meters and the height of the extending tube 42 of each of the dredging devices 4, 4', 4" are 150 meters, 100 meters, and 50 meters, respectively.

Initially, the main gate 2 is open while the control unit 47 of each of the dredging devices 4, 4', 4" is in the first state. The opening of the main gate 2 prompts the water in the primary reservoir 800, together with sediments deposited therein, to flow into the linking tube 41 of the dredging device 4 via the dredging tube 1. Impeded by the water gate 43 of the dredging devices 4 from flowing downstream, the water is then directed to flow upwardly into the extending tube 42 of the dredging device 4 instead. As long as the water level of the primary reservoir 800 is higher than the height of the extending tube 42, the water would flow through the extending tube 42 and out of the top outlet 421 under the pressure of the hydraulic head.

It should be noted that the height of the extending tube 42 of the dredging device 4 is 150 meters, meaning that the water level difference between the primary reservoir 800 and the extending tube 42 is only 50 meters, delivering a stable velocity of the water flow in the dredging tube 1 and the linking tube 41, which in turn prevents serious abrasion within the interior surface of the dredging tube 1 and the linking tube 41.

The water flowing through the extending tube 42 becomes clearer as it travels therethrough and toward the top outlet 421, with the sediments it carried settling into the auxiliary tubes 48 of the dredging device 4. Then, the water coming out of the top outlet 421 is driven into the power generating unit 44 of the dredging device 4, producing renewable hydroelectric power. Afterward, the water is guided to designated location downstream (as indicated in FIG. 1) for further hydroelectric uses. When the control unit 47 is in the first state, the auxiliary gates 49 are closed for settlement of the sediments carried by the water in the auxiliary tubes 48.

When the water level of the primary reservoir 800 is near 150 meters, the height of the water at the primary reservoir is substantially equal to the height of the extending tube 42 of the dredging device 4, in which the water within the extending tube 42 will no longer flow out of the top outlet 421. At this time, the control unit 47 of the dredging device 4 is altered into the second state, opening the water gate 43, the stop gate 46 and the auxiliary gates 49, thereby inducing a new water flow between the secondary reservoirs 900, 900' due to difference in water level. The sediments clogged within the auxiliary tubes 48 of the dredging device 4 are released into the secondary reservoir 900 and carried downstream through the stop gate 46 and the water gate 43 into the linking tube 41 of the dredging device 4'. However, since the water gate 43 of the dredging device 4' is still closed, the water flows upwardly into the extending tube 42 of the dredging device 4' instead.

Similar to the previous situation, the velocity of the water flow in the linking tube 41 of the dredging device 4' is maintained to be stable in the dredging tube 1 and the linking tube 41 of the dredging device 4 as before, as the water level difference of the primary reservoir 800 (150 meters currently) and the secondary reservoir 900' (100 m) is also 50 meters. When the water level of the primary reservoir 800 is further reduced to 100 m, the control unit 47 of the dredging device 4' is changed to the second state, and so similar cycle occurs to the dredging device 4" as well. Ultimately, the water level of the primary reservoir 800 and the secondary reservoirs 900, 900', 900" are reduced to a minimum water level, with all the water and sediments successfully transferred downstream.

It should be noted that, the number of the dredging devices 4, 4', 4" utilized may vary in other embodiments, and the number of the auxiliary tube 48 and gate 49 of each dredging device 4, 4', 4" may vary in other embodiments, and may be redesigned based on scale of sediments to be dredged.

In other embodiments of the disclosure, all of the dredging device 4, 4', 4" may not include the power generating unit 44, the guide tube 45, the stop gate 46, the auxiliary tubes 48 and auxiliary gate 49. In the extreme case, the reservoir dredging assembly may simply include one dredging device 4 with the aforementioned elements removed.

Figure 6:
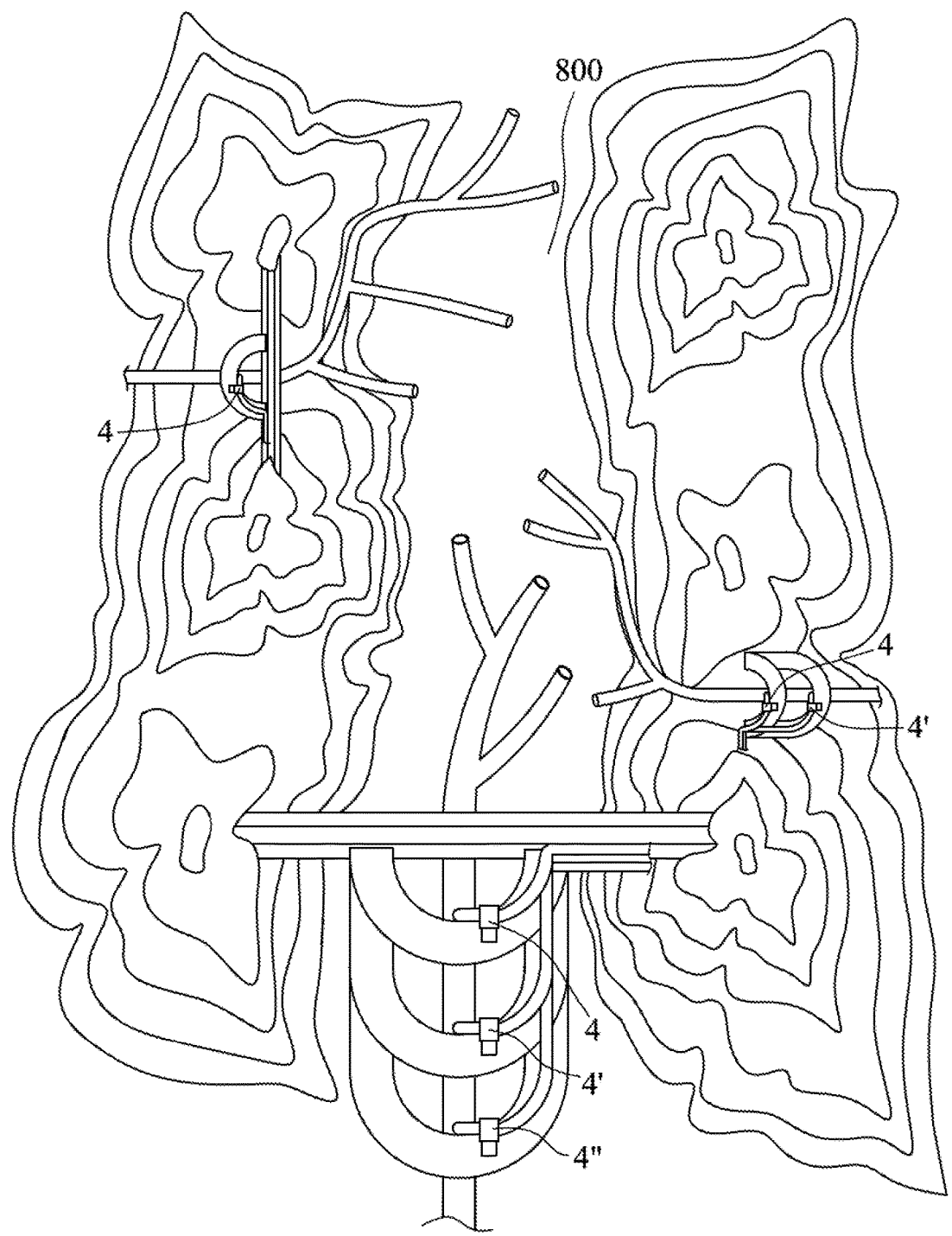
FIG. 6 is a top view illustrating a scenario where multiple instances of the embodiment can be utilized in a large primary reservoir.

Referring to FIG. 6, a plurality of the disclosure may be utilized as a set in a large-scaled reservoir, each with the flexible configuration as described before.

In summary, by utilizing the dredging devices 4, 4', 4" of various water levels to reduce the water level difference between the two sides, the reservoir dredging assembly is able to carry the sediments off the main reservoir 800 via stabilized water flow through the dredging tube 1 and the linking tubes 41 of the dredging devices 4, 4', 4" without damaging the interior surfaces thereof, prolonging the service life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A reservoir dredging assembly comprising:
   a dredging tube adapted to be laid on a bottom of a primary reservoir; and
   at least one dredging device adapted to be installed to at least one secondary reservoir which is located downstream of the primary reservoir and which has a maximum water level lower than a maximum water level of the primary reservoir, and including
      a linking tube that is connected to said dredging tube, so that water in the primary reservoir, together with sediments deposited therein, is permitted to flow into said linking tube via said dredging tube,
      an extending tube that extends upwardly from said linking tube, and that has a top outlet adapted to be located lower than the maximum water level of the primary reservoir, and
      a water gate that is mounted in said linking tube at a position downstream of said extending tube;
   wherein, when said water gate is closed, the water advanced from the primary reservoir into said linking tube is directed into said extending tube and flows out of said extending tube from said top outlet;
   wherein, when the water level of the at least one secondary reservoir is reduced to be substantially equal to a height of said top outlet of said extending tube, said water gate is operable to be opened, so that the water in said linking tube is permitted to flow through said water gate;
   wherein said extending tube extends upwardly and obliquely from said linking tube;
   wherein said at least one dredging device further includes at least one auxiliary tube extending downwardly from said extending tube, and an auxiliary gate electrically connected to said control unit and disposed at a distal end of said at least one auxiliary tube;
   wherein when said water gate is closed, said auxiliary gate is operable to close for settlement of sediments which is carried by water in said auxiliary tube; and
   wherein when said water gate is opened, said auxiliary gate is operable to open for allowing the water in said auxiliary tube to flow into the at least one secondary reservoir.

2. The reservoir dredging assembly as claimed in claim 1, wherein said at least one dredging device further includes a power generating unit driven by the water that flows out of said extending tube from said top outlet.

3. The reservoir dredging assembly as claimed in claim 2, wherein said at least one dredging device further includes a guide tube for draining the water that flows through said power generating unit.

4. The reservoir dredging assembly as claimed in claim 1, wherein:
   said at least one dredging device further includes a stop gate connected to said linking tube;
   when said water gate is closed, said stop gate is operable to close; and
   when said water gate is opened, said stop gate is operable to open for allowing the water in the at least one secondary reservoir to flow into said linking tube.

5. The reservoir dredging assembly as claimed in claim 1, further comprising a stirring device operable for mixing sediments and water in the primary reservoir.

6. The reservoir dredging assembly as claimed in claim 1, comprising a plurality of said dredging devices adapted to be installed respectively to a plurality of the secondary reservoirs which are arranged in a manner that a maximum water level of each the secondary reservoirs is lower than that of an upstream one of the secondary reservoirs, said extending tube of each dredging device has a length longer than that of said extending tube of another dredging device which is disposed downstream of said dredging device, said linking tubes of said dredging devices being connected together.

* * * * *